United States Patent
Schmalzried et al.

(10) Patent No.: US 10,040,157 B2
(45) Date of Patent: Aug. 7, 2018

(54) DEVICE FOR HOLDING A TOOL

(71) Applicant: HOCHSCHULE FURTWANGEN, Furtwangen (DE)

(72) Inventors: Siegfried Schmalzried, Singen (DE); Thomas Herberth, Tuttlingen (DE)

(73) Assignee: HOCHSCHULE FURTWANGEN, Furtwangen (DE)

( * ) Notice: Subject to any disclaimer, the term of this patent is extended or adjusted under 35 U.S.C. 154(b) by 18 days.

(21) Appl. No.: 15/128,526

(22) PCT Filed: Mar. 20, 2015

(86) PCT No.: PCT/EP2015/055960
§ 371 (c)(1),
(2) Date: Sep. 23, 2016

(87) PCT Pub. No.: WO2015/144588
PCT Pub. Date: Oct. 1, 2015

(65) Prior Publication Data
US 2017/0120407 A1    May 4, 2017

(30) Foreign Application Priority Data
Mar. 26, 2014   (DE) .................. 10 2014 104 192

(51) Int. Cl.
   *B23B 31/20*  (2006.01)
   *B23Q 11/10*  (2006.01)
   *B23B 31/117*  (2006.01)

(52) U.S. Cl.
   CPC ...... *B23Q 11/1023* (2013.01); *B23B 31/1179* (2013.01); *B23B 2231/24* (2013.01); *B23B 2250/12* (2013.01)

(58) Field of Classification Search
CPC . B23B 31/02; B23B 31/1179; B23B 2231/24; B23B 2250/12; B23Q 11/1023
See application file for complete search history.

(56) References Cited

U.S. PATENT DOCUMENTS

| | | |
|---|---|---|
| 4,881,431 A | 11/1989 | Bieneck |
| 6,135,679 A | 10/2000 | Kazda |
| 2011/0156363 A1 | 6/2011 | Haimer |

(Continued)

FOREIGN PATENT DOCUMENTS

| | | |
|---|---|---|
| CA | 2 232 333 A1 | 2/1997 |
| DE | 36 01 385 A1 | 7/1987 |
| DE | 197 54 518 A1 | 6/1999 |

(Continued)

OTHER PUBLICATIONS

International Search Report Corresponding to PCT/EP2015/055960 dated Jun. 5, 2015.

(Continued)

*Primary Examiner* — Daniel Howell
*Assistant Examiner* — Paul M Janeski
(74) *Attorney, Agent, or Firm* — Davis & Bujold PLLC; Michael J. Bujold

(57) ABSTRACT

A device (1) for holding a tool (3), and the device (1) has a cavity (2) for the tool (3) and at least two channels (6) designed to allow the passage of a lubricant. Each channel has an inlet opening (7) and an outlet opening (8) for the lubricant. The at least two channels (6) are helically formed around the bore (2) and have a cross-section which increases in size from the inlet opening (7) to the outlet opening (8).

11 Claims, 2 Drawing Sheets

(56) References Cited

U.S. PATENT DOCUMENTS

2012/0163931 A1    6/2012  Friedrichs

FOREIGN PATENT DOCUMENTS

| DE | 10 2008 044 996 A1 | 3/2010 |
| DE | 10 2009 043 850 A1 | 3/2011 |
| EP | 0 956 919 A1 | 11/1999 |
| JP | 2000-015539 A | 1/2000 |
| WO | 97/05987 A1 | 2/1997 |

OTHER PUBLICATIONS

Written Opinion Corresponding to PCT/EP2015/055960 dated Jun. 5, 2015.

DEVICE FOR HOLDING A TOOL

The invention relates to a device for receiving a tool in accordance with the method defined in greater detail in the preamble of claim 1.

A generic device is known from DE 197 54 518 C2. In this instance, there are formed in an inner wall of the device which is constructed as a bushing a plurality of axially parallel grooves which extend through the entire length of the bashing and through which a lubricant is supplied to a tool which is received in the bushing.

A thread cutting chuck which is constructed for minimum lubrication is described in EP 0 956 919 A1.

Figure 1:
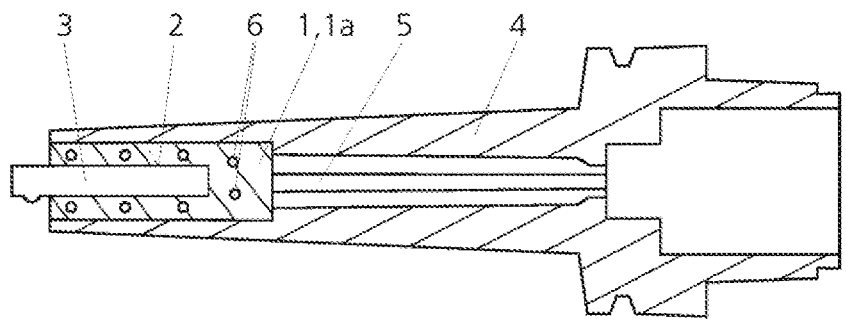

A problem with the known solutions is in particular the separation which occurs during use of the aerosol which is used as a lubricant inside the channels which extend through the device, in particular at higher speeds, whereby a good lubricant supply to the tool which is arranged in the device is not provided.

An object of the present invention is therefore to provide a device which is for receiving a tool which is intended to be supplied with a lubricant and with which using simple means a minimum lubrication of the tool is possible.

According to the invention, this object is achieved by the features mentioned in claim 1.

As a result of the channels which expand according to the invention from the respective inlet opening to the respective outlet opening and which are used for the lubricant to flow through, a separation of the lubricant which is generally in the form of an aerosol is prevented since the oil contained in the aerosol is retained in the aerosol as mist droplets as a result of the reduced pressure which is produced by the expansion of the channel cross-section and the associated expansion of the gas contained in the aerosol, and cannot be deposited on the surfaces of the channel.

As a result of the coiling according to the invention of the at least two channels, the radial acceleration of the aerosol which flows through the channels during the rotation of the device is significantly reduced, which also contributes to preventing the separation of the aerosol.

According to the invention, there is consequently produced a device which may be configured in such a manner that it can be used for standard catalogue clamping chucks and standard catalogue tools and no adaptations are required when handling the tools. Furthermore, the device according to the invention can be configured in such a manner that it engages as round the tool so that no additional interference contour is provided by the device. Furthermore, as a result of the device according to the invention, very good concentricity can be achieved, whereby it can also be used at high speeds.

Another advantage of the solution according to the invention is that, with thin tools, an inner cooling channel can be dispensed with so that a higher tool stability, a lower level of wear and a higher quality are achieved. Furthermore, the solution according to the invention also results in lower costs for the tool since a lubricant channel which extends through the tool can be dispensed with.

If, in a very advantageous development of the invention, the cross-section of the outlet openings of the channels is from 8 to 15% greater than the cross-section of the inlet openings of the channels, this has particularly positive effects on the prevention of the separation of the lubricant flowing through the channels.

A particularly simple embodiment of the cross-section increase of the channels is produced, when the channels extend conically from the inlet opening to the outlet opening.

Furthermore, there may be provision for the device to be produced by means of sintering, with particular regard to the production of the coiled channels, sintering has been found to be a very simple possibility for producing the device according to the invention.

A uniform lubricant supply to the tool contained in the device according to the invention is produced when there are provided two channels which are offset through 180° with respect to each other.

This is also the case when alternatively there are provided three channels which are offset through 120° with respect to each other. As a result of the use of three channels, an even better lubricant supply to the tool is achieved.

When the admixture is intended to be discharged from the channels in a particularly fine distribution, there may further be provision for the outlet openings of the channels to be constructed as Laval nozzles which are orientated in the direction of the center axis of the device. As a result of the use of such a Laval nozzle, splitting of the droplets which are contained in the aerosol is achieved, which leads to better and more uniform wetting of the tool with the lubricant. In this instance, as a result of the outlet openings which are orientated in the direction of the center axis of the device, there is produced a centering of the lubricant in the direction toward the tool.

In order to avoid to the greatest possible extent the separation of the aerosol as a result of the rotation of the device when it is used, there pay further be provision for the coiling of the channels to be configured in such a manner that an aerosol droplet which is contained in the lubricant moves at a predetermined speed as a superimposed movement comprising rotation and inherent speed in an at least substantially linear manner from the inlet opening to the outlet opening.

A particularly advantageous use of the device according to the invention is produced when it is constructed as a tool receiving bushing for arrangement inside a clamping chuck.

In this context, another advantageous embodiment of the invention may involve the sum of the cross-sectional surface-areas of the channels in the region of the inlet openings at least, substantially corresponding to the cross-section of an outlet opening of a channel which is provided for the lubricant to flow through in the clamping chuck. In this manner, the pressure and the flow speed within the entire channel through which the lubricant flows are kept constant both inside the clamping chuck and inside the tool receiving bushing which is received in the clamping chuck.

An embodiment of the invention is illustrated schematically below with reference to the drawings.

In the drawings:

FIG. 1 is a cross-sect ion through a device according to the invention which in this embodiment is constructed as a tool receiving bushing which is received in a clamping chuck;

FIG. 2 is a perspective illustration of the device according to the invention from FIG. 1 with the channels which are contained therein and which are provided for a lubricant to flow through;

FIG. 3 is an enlarged illustration in accordance with line III from FIG. 2; and FIG. 4 shows the cross-sectional, surface-areas of the inlet openings of the channels inside the device which is constructed as a tool receiving bushing and an outlet opening of the channel inside the clamping chuck.

FIG. 1 shows a device 1 which is constructed in the embodiment illustrated as a tool receiving bushing 1a and which has a central hole 2 for receiving a tool 3, for example, a milling or drilling tool. The tool receiving bushing 1a itself is received in a clamping chuck 4 which can be clamped in a manner known per se in a machine tool which is not illustrated. The connection of the tool receiving bushing 1a to the clamping chuck 4 and the connection of the tool 3 to the tool receiving bushing 1a can also be carried, out in a manner known per se, for example, by means of shrink connections. In addition to shrinking, other connection possibilities are naturally also conceivable.

There extends in the clamping chuck 4 a central channel 5 which is provided for a lubricant which is not illustrated to flow through. In this instance, the channel 5 serves to supply the lubricant to at least two channels 6 which are located inside the tool receiving bushing 1a and through which the lubricant also flows in order to supply toe lubricant to the tool 3. There is preferably used as a lubricant an aerosol in which oil droplets are preferably dissolved in a gas, such as, for example, air or compressed air.

In an embodiment which is not illustrated, it would also be possible for the channels 6 to be provided in the clamping chuck 4, that is to say, for the tool receiving bushing 1a to be omitted and the device 1 to be formed by the clamping chuck 4 in which the tool 3 is then directly received.

Figure 2:
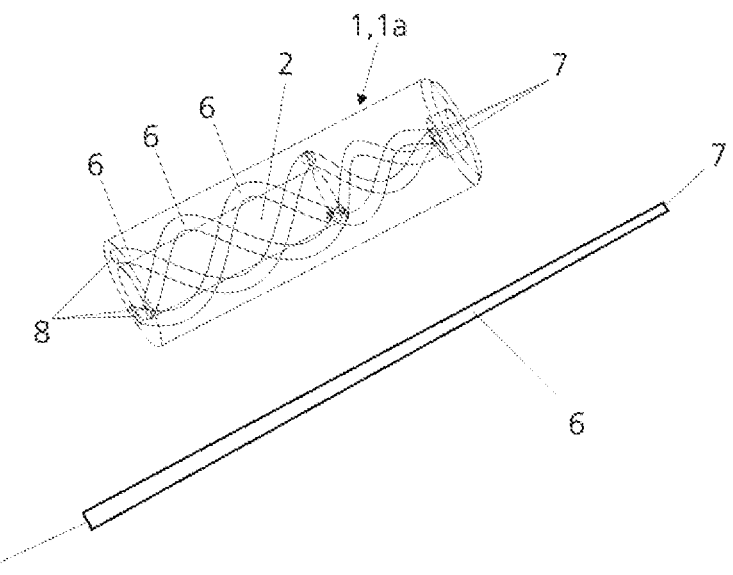

FIG. 2 is a perspective illustration of the tool receiving bushing 1a and the path of the (in this instance) three channels 6 through it can be seen. This shows that the in this instance) three channels 6 extend in a helical manner around the hole 2 of the tool receiving bushing 1a. In the present case, the three channels 6 are arranged offset through 120° with respect to each other in order to achieve a symmetry thereof. In an embodiment which is not illustrated and in which only two channels 6 are provided, these could accordingly be arranged offset through 180° with respect to each other. The same also applies to a larger number of channels 6 inside the tool receiving bushing 1a. The number of channels 6 may, for example, be dependent on the size of the tool 3 which is received in the hole 2. Thus, a variant with four or more channels 6 is also conceivable in order to also enable devices 1 with a minimum diameter, in particular when they are constructed as a tool receiving bushing 1a.

FIG. 2 is further a developed view of one of the channels 6 from which it can be seen that the channels 6 have a cross-section which increases from an inlet opening 7 at the upper side of the tool receiving bushing 1a to an outlet opening 8 at the lower side of the tool receiving bushing 1a. This increasing cross-section of the channels 6 serves to prevent the separation of the lubricant which flows through the channels 6. In the embodiment which is illustrated in FIG. 2, the channels 6 extend conically from the inlet opening 7 to the outlet opening 8. Furthermore, in the present embodiment, the cross-sect ion of the outlet openings 8 of the channels 6 is from 8% to 15% greater than the cross-section of the inlet openings 7 of the channels 6. However, the relationship of the cross-section of the outlet openings 6 to the cross-section of the inlet openings 7 is not illustrated to scale in FIG. 2.

The channel routing of she channels 6 is configured for a minimum lubrication of the tool 3 and preferably does not have any sharp-edged corners in order to prevent formation of droplets and consequently a separation. Instead, all the sharp edges, such as, for example, 90° corners, are rounded at transition locations, such as, for example, at the inlet openings 7, or inside the channels 6 so as to promote flow.

The coiling of the channels 6 is in this instance configured in such a manner that an aerosol droplet which is contained in the lubricant moves at a predetermined speed as a superimposed movement comprising rotation and inherent speed at least substantially in a linear manner from the inlet opening 7 to the outlet opening 8. If, for example, a milling spindle is configured for a speed of 20,000 rpm, the length of the tool receiving bushing 1a is 0.08 m and the flow speed of the aerosol is 10 m/s, an oil droplet flows through the tool receiving bushing 1a in a time of 0.008 s. Within this time of 0.008 s, the spindle and consequently also the tool receiving bushing 1a have traveled 2.66 revolutions so that the coiling of the channels is configured for 2.66 transitions over the length of the tool receiving bushing 1a of 0.08 m. That is to say, therefore, in this instance, a channel 6 turns 2.66 times or at an angle of approximately 960° about the hole 2 of the tool receiving bushing 1a. As a result of such a configuration of the channels 6, no transverse acceleration acts in principle on the oil droplets contained in the aerosol.

Figure 3:
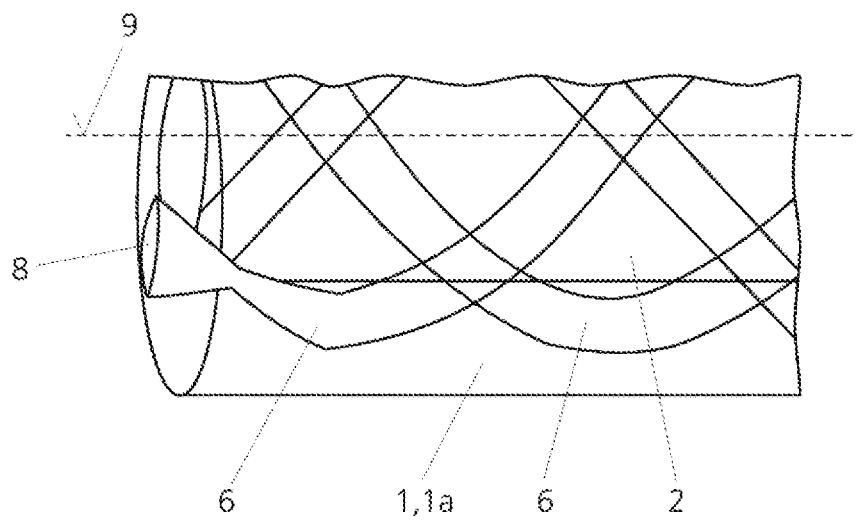

The enlarged illustration of FIG. 3 illustrates one of the outlet openings 8 of one of the channels 6. From this it can be seen that the outlet opening 8 is constructed in the form of a Laval nozzle in order to split the oil droplets located in the aerosol. Furthermore, it can be seen that the outlet opening 8 is orientated in the direction of a center axis 9 of the tool receiving bushing 1a.

Figure 4:
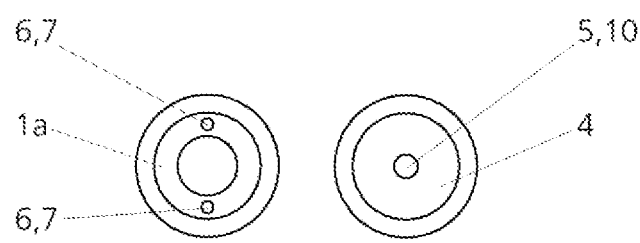

FIG. 4 shows the cross-sectional surface-areas of the inlet openings 7 of the channels 6 which extend through the tool receiving bushing 1a and the cross-sectional surface-area of an outlet opening 10 of the channel 5 which extends through the clamping chuck 4. Preferably, the total of the cross-sectional surface-areas of the channels 6 in the region of the inlet openings 7 is at least substantially equal to the cross-sectional surface-area of the outlet opening 10 of the channel 5 in the clamping chuck 4 so that a constant pressure and a constant flow speed is achieved within the entire channel through which the lubricant flows inside the clamping chuck 4 and the tool receiving bushing 1a.

In principle, the tool receiving bushing 1a may be constructed in extremely different lengths and diameters, both with regard to the outer diameter thereof and with respect to the diameter of the hole 2. Preferably, the tool receiving bushing 1a or generally the device 1 is produced by means of sintering from a suitable material.

The invention claimed is:

1. A device (1) for receiving a tool (3), the device (1) having a recess (2) for the tool (3) and having at least two channels (6) which are provided for a lubricant to flow through and which each have an inlet opening (7) and an outlet opening (8) for the lubricant, wherein the at least two channels (6) have a cross-sectional area which increases from the inlet opening (7) to the outlet opening (8) and the at least two channels (6) extend around the hole (2) in a helical manner.

2. The device (1) according to claim 1, wherein a cross-sectional area of the outlet openings (8) of the channels (6) is between 8 to 15% greater than a cross-sectional area of the inlet openings (7) of the channels (6).

3. The device (1) according to claim 1, wherein the at least two channels (6) each extend conically from the inlet opening (7) to the outlet opening (8).

4. The device (1) according to claim 1, wherein the device (1) is produced by sintering.

5. The device (1) according to claim 1, wherein the at least two channels (6) are offset by 180° with respect to one another.

6. The device (1) according to claim 1, wherein the at least two channels (6) comprise first, second and third channels (6) which are offset by 120° with respect to one another.

7. The device (1) according to claim 1, wherein the outlet openings (8) of the at least two channels (6) are constructed as Laval nozzles which are orientated in a direction of a center axis (9) of the device (1).

8. The device (1) according to claim 1, wherein coiling of the at least two channels (6) is configured in such a manner that an aerosol droplet, which is contained in the lubricant, moves at a predetermined speed as a superimposed movement comprising rotation and inherent speed in an at least substantially linear manner from the inlet opening (7) to the outlet opening (8).

9. The device (1) according to claim 1, the device (1) is constructed as a tool receiving bushing (1*a*) for arrangement inside a clamping chuck (4).

10. The device (1) according to claim 9, wherein a sum of cross-sectional surface-areas of the at least two channels (6), in a region of the inlet openings (7), at least substantially corresponds to a cross-section of an outlet opening (10) of a channel (5) which is provided for the lubricant to flow through in the clamping chuck (4).

11. A device for receiving a tool, the device comprising:

a recess for receiving the tool, the recess extending along a longitudinal axis of the device;

at least two channels, each of the at least two channels having an inlet opening and an outlet opening, and the at least two channels extending axially along the device and facilitating flows of lubricant through the device from the inlet openings to the outlet openings;

each of the at least two channels having a lateral cross-section, the cross-section of each of the at least two channels having an area that increases from the inlet opening to the outlet opening; and the at least two channels extend around the hole in a helical manner.

* * * * *